United States Patent [19]
Weichel

[11] 3,938,677
[45] Feb. 17, 1976

[54] APPARATUS FOR DISTRIBUTING MATERIAL INTO A STORAGE ROOM, SILO AND THE LIKE

[76] Inventor: Ernst Weichel, Bahnhofstrasse 1, 7326 Heiningen, Germany

[22] Filed: May 22, 1973

[21] Appl. No.: 362,871

[30] Foreign Application Priority Data
May 25, 1972 Germany............................ 2225387

[52] U.S. Cl................................ 214/17 CB; 302/60
[51] Int. Cl.²......................................... B65G 65/32
[58] Field of Search............... 214/17 CB, 33, 17 C; 198/100, 88; 302/60, 61, 9, 10

[56] References Cited
UNITED STATES PATENTS

| | | | |
|---|---|---|---|
| 633,561 | 9/1899 | Bartholomew......................... | 302/10 |
| 728,511 | 5/1903 | Stallard................................. | 302/10 |
| 1,100,959 | 6/1914 | Dick ...................................... | 302/60 |
| 3,487,961 | 1/1970 | Neuenschwander............ | 214/17 CB |
| 3,565,268 | 2/1971 | Buschbom ...................... | 214/17 CB |

*Primary Examiner*—Robert G. Sheridan
*Assistant Examiner*—G. Auton
*Attorney, Agent, or Firm*—Toren, McGeady and Stanger

[57] ABSTRACT

In distributing material, such as stalks, leaves and the like, by means of a tubular conveyor into a storage space, the outlet section of the conveyor is positioned within the upper end of the space and is supported so that it can be pivoted in a horizontal plane about a vertical axis. The outlet end of the conveyor is supported from a vertical column centered within the storage space so that it can be moved along a circular path about the column for the uniform distribution of the material. The outlet section of the conveyor is made up of a number of telescopically arranged sections movably supported from a guide rail which is also pivotally supported. The position of the outlet end of the conveyor relative to the center column can be varied to change the radius of the arcuate path travelled by the outlet end.

8 Claims, 3 Drawing Figures

APPARATUS FOR DISTRIBUTING MATERIAL INTO A STORAGE ROOM, SILO AND THE LIKE

SUMMARY OF THE INVENTION

The present invention is directed to an apparatus for distributing stalks, leaves or bulk material into a laterally enclosed storage space and, more particularly, it concerns the arrangement and support of the outlet section of a tubular conveyor so that its outlet end can be moved along an arcuate path for the uniform distribution of the material into the storage space.

While known apparatus is available for distributing material into a storage space, such apparatus has the disadvantage that it is suitable only for storage spaces having a relatively small transverse storage area, that is, transverse areas which are not larger than the scatter range of distributors used with such known apparatus. Another drawback noted in the known apparatus is that it is not suitable for use in a storage space which has a center column, for example, where the column is used for feeding or withdrawing the material or as a support for the roof over the storage space.

Silos, hay towers and so-called hay barracks with roofs often have a relatively large diameter and use a centrally positioned supporting column for the roof. A hay barrack is a structure with a movable roof used to cover a hay or straw rick. With a supporting column at the center of such structures, the known conveyors and distributors cannot be used effectively because their outlets are required to be located exactly at the center of the storage space. Further, the scatter range of the known end distributors is not sufficient for storage members having a large transverse storage surface. Where the usual arrangement is to provide an upwardly extending section of the tubular conveyor adjacent the exterior surface of the storage space, it is very difficult to arrange an outlet conveyor section in the upper portion of the storage space so that a uniform distribution of the material can be effected. Even where the outlet conveyor section is movable or telescopically extensible, the center column interferes with the distribution of the material so that it cannot be spread evenly over the supporting surface.

Accordingly, the present invention is directed to a solution of this problem by providing a tubular conveyor having a vertically arranged conveyor section located exteriorly of the support space and an outlet conveyor section extending from the vertical section and positioned in the upper end of the support space so that the outlet section can be pivoted about the axis of the vertical section.

Therefore, in accordance with the present invention, a uniform distribution of material onto a large area supporting surface in a storage space can be obtained by forming the outlet section of the tubular conveyor from a plurality of telescopic sections and supporting the outlet sections so that the outlet end can be moved along a circular path concentric to the central axis of the storage space.

In this arrangement the telescopic outlet conveyor section secured in the upper end of the storage space is supported on the end of an arm which extends radially outwardly from the center column so that the end of the arm supporting the outlet end of the conveyor can be moved along a circular path about the center column. As the outlet section of the conveyor is moved, its individual telescopic sections extend outwardly and, at full extension, contact the center column. From this point of contact the movement of the arm can be reversed so that it traverses a path of almost 360° with the telescopic sections contracting and again extending until the outlet section again contacts the center column. As a result, the outlet end of the conveyor can be moved along a path of almost a full circle.

In another embodiment of the invention, if there is no center column, the arm can be supported so that it carries the outlet end of the conveyor through a complete 360° path.

In a preferred embodiment, the end of the arm supporting the outlet end of the tubular conveyor can be displaced between the center column and the inside surface of the storage space and can be locked and, further, the telescopic outlet sections of the conveyor are suspended in a sliding or rolling manner from a guide rail.

The guide rail is arranged to extend inwardly into the upper end of the storage space and its inner end is suspended from the arm along with the outlet telescopic section of the conveyor by means of a joint member which can be pivoted about a vertical axis. The end of the guide rail located outside the storage space is mounted for displacement in a bearing block which is arranged to rotate about the vertical axis of the conveyor extending upwardly along the outer surface of the storage space.

Preferably, the arm is rotated about the center column by means of a rotor and driving elements.

By using limit switches associated with the motor driving the arm, the field of traverse of the arm can be set to any desired sector of its circular path.

When the arm rotates the conveyor to the end position where the conveyor contacts the center column, the arm is reversed by known means so that it reverses direction and traverses the same circular path for almost 360° until the outlet sections of the conveyor again contact the center column. During the movement from one end position to the other the telescopic sections, fully extended in the end position, are retracted during one half of the path of travel and then are again extended during the second half until the opposite end position is reached with the outlet section of the conveyor again contacting the center column.

If an end distributor is positioned at the conveyor outlet opening the material discharged from the conveyor can be distributed in a circular scatter range affording a uniform placement of the material over the entire supporting surface. In other words, as the outlet section of the conveyor is moved along the circular path about the center column between its two end positions, the end distributor is moved about the outlet end of the conveyor so that a multiple number of circular paths are described by the end distributor in directing the material onto the support surface in the storage space. Accordingly, though the outlet end of the conveyor does not describe a complete 360° circle, the use of the end distributor permits overlapping scattering of the material. By the support arrangement for the outlet end of the conveyor, it is possible to suspend the individually movable telescopic sections of the conveyor above the supporting surface in the storage space on the guide rail and to guide the sections along the rail so that bending and lateral forces are absorbed exclusively by the rail itself.

This arrangement ensures a reliable, trouble-free operation during the extension and retraction of the telescopic conveyor sections as the arm moves the outlet part of the conveyor along a circular path.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
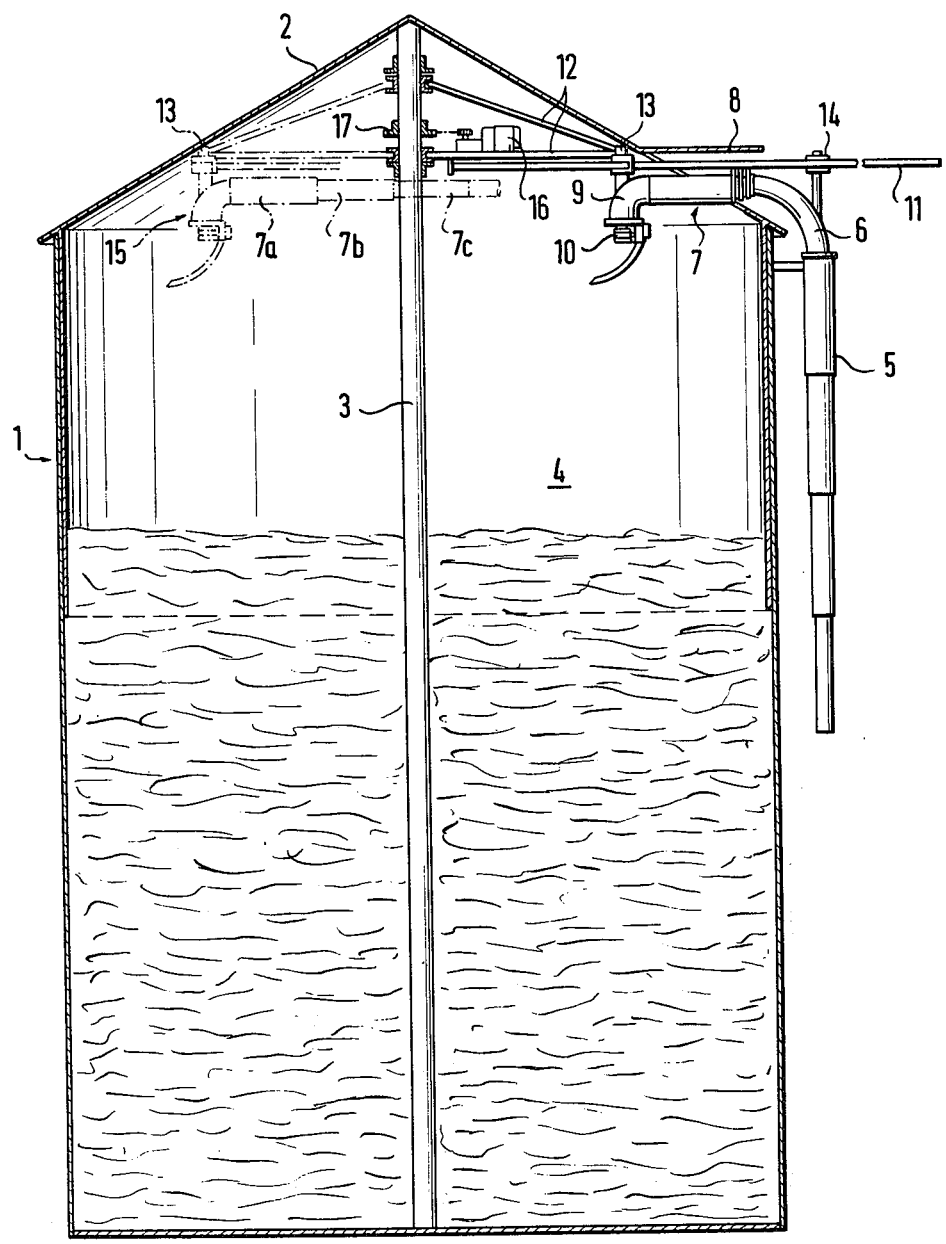
FIG. 1 is a side elevational view, partly in section, of a storage space embodying the conveyor arrangement of the present invention.

In FIG. 1, the storage space 4 is arranged as a so-called hay barrack with a vertically movable side wall 1 covered at its upper end by a roof 2 which is supported centrally on a column 3. The center column 3 forms not only a support for the roof 2 but also a guide for the movable side wall 1.

A hay tower or silo could be designed in a similar manner.

Located adjacent to the exterior surface of the storage space 4 is a vertically extending tubular conveyor section 5 which can be extended and retracted telescopically during upward and downward movement of the vertically movable side wall 1.

A pipe bend 6 is connected to the upper end of the tubular conveyor section 5 so that it can be pivoted about the longitudinal axis of the upwardly extending conveyor section. The opposite end of the pipe bend 6 is connected to a substantially horizontally extending tubular outlet conveyor section 7 which consists of several telescopic conveyor sub-sections 7a, 7b, 7c which are suspended for longitudinal displacement along a guide rail 11. The conveyor outlet section 7 extends across the upper end of the storage space 4 for directing the material downwardly onto the supporting surface within the storage space.

At the free end of the conveyor section 7, an outlet conveyor sub-section 7a supports a pipe bend 9 which directs the material being distributed downwardly. An end distributor 10 is secured to the outlet end of the pipe bend so that the material can be directed in a particular direction and pattern onto the surface of the material within the storage space.

An arm 12 is rotatably supported on the center column 3 and a joint member 13, positioned on the radially outer end of the arm, movably mounts the end of the guide rail located within the storage space. The telescopic conveyor sub-sections 7a, 7b, 7c are individually suspended so that they slide or roll on the guide rail 11.

The end of the guide rail located exteriorly of the storage space is mounted for displacement in a bearing block 14. The bearing block is mounted for rotation about the vertical axis of the conveyor section 5.

Figure 2:
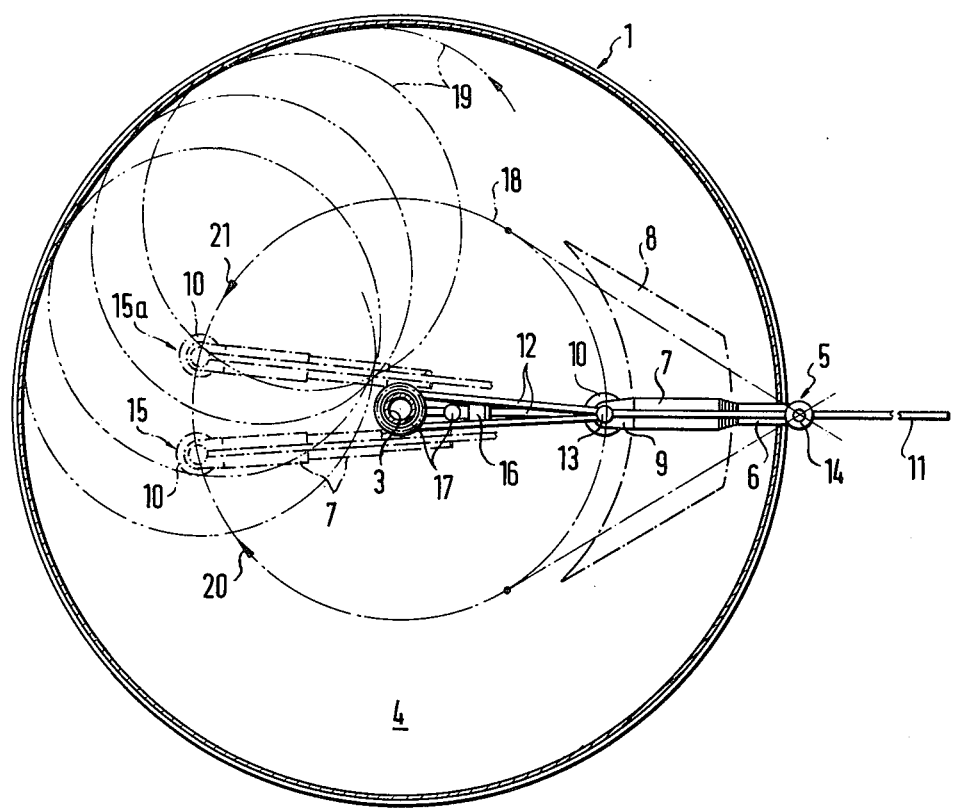
FIG. 2 is a top view of the arrangement shown in FIG. 1 indicating the pattern of movement of the conveyor within the storage space.

In FIGS. 1 and 2 the fully extended end position of the outlet conveyor section 7 is indicated in dot-dash lines with the conveyor sub-section 7a forming the outlet from the conveyor.

The outer end of the guide rail 11 extends through the pivotal bearing block 14 and is movably displaceable relative to the block as the outlet conveyor section 7 is positioned within the storage space 4.

The pivotal movement of the arm is effected by the driving motor 16 through driving elements 17. By using known limit switches in association with the motor, the pivotal movement of the arm can be started, stopped, reversed, as required.

As it can be seen from FIG. 2, the retracted telescopic conveyor sub-sections 7a, 7b, 7c are arranged on the pipe bend 9 radially to the circular base of the storage space 4. The retracted pipe sections 7a, 7b, 7c, etc. are extended telescopically so that they approximately touch the center column 3 in the end position. As soon as the end position 15 is reached, the direction of rotation of the drive 16, 17 is reversed by known means, not shown.

It is advisable to arrange on the pipe bend 9 an end distributor 10 which ejects the material over a circular scatter range. If the diameter of this scatter range corresponds approximately to the radius of the bearing surface, a very uniform distribution of the constantly moving and constantly overlapping scatter ranges 19 is achieved by the circular distribution of the stem products and bulk material by the end distributor 10 in connection with the constant shifting of the position of the tip or of the end distributor 10 over a circular arc. The center column 3 arranged in the center of the storage space 4 practically does not prevent a uniform distribution.

Furthermore, it is advisable to use an air-driven end distributor 10 in order to avoid interfering cable connections between a stationary motor and the distributor 10.

The invention represents obviously an essential progress.

Figure 3:
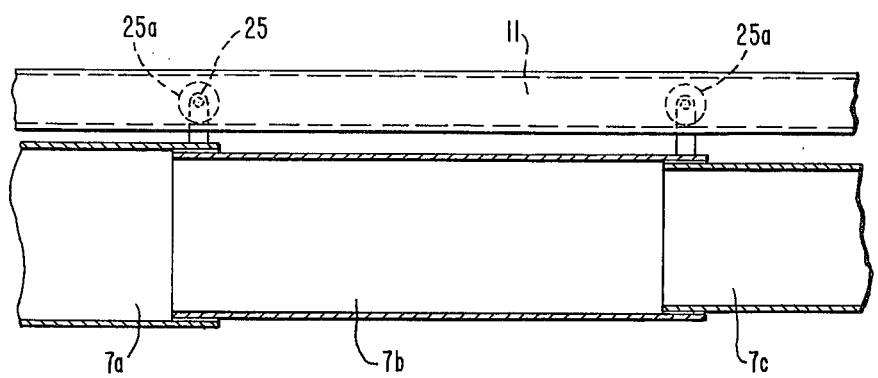
FIG. 3 is a detailed view in section of the support for the horizontal conveyor means.

As it can be seen from FIG. 3, the guide rail 11 is designed as a U or angle section, so that rollers 25a can run on its lower horizontal part, which are secured on the outside at the end of the conveyor sub-sections 7a, 7b, 7c, etc. remote of the pipe bend.

The free end of the conveyor sub-sections 7a, 7b, 7c, etc., facing the pipe bend 9 slides in any position in the adjacent pipe section, so that an additional fastening is not necessary.

As can be seen in FIGS. 1 and 2, the retracted telescopic conveyor sub-section 7a, 7b, 7c are positioned in the roof opening 8 and they extend radially of the center column 3 within the storage space. By means of the motor 16 and the drive elements 17 the arm 12 is turned in the direction of the arrow 20 and the joint member 13 located on the end of the arm gradually moves outwardly along the guide rail to its end as the outlet conveyor section 7 is moved from its retracted position to its fully extended position as it travels along the circular path 18. As is indicated in FIG. 2, when the outlet conveyor section 7 reaches the end position 15, the conveyor contacts the side of the center column 3 and is prevented from continuing in the circular path 18. When the end position 15 is reached, the direction of rotation of the drive motor 16 is reversed and the outer end of the arm 12 with its joint member 13 starts to move in the opposite direction, shown by the arrow 21 and traverses nearly 360° until it reaches the other end position 15a. Again, in the end position 15a, the conveyor section 7 contacts the center column and the movement of the arm and the conveyor is again reversed.

It is preferable to provide an end distributor 10 at the outlet from the pipe bend 9 so that the material can be directed over a circular scatter range, note the overlapping circular patterns 19 in FIG. 2. If the diameter of the scatter range corresponds substantially to the radius of the supporting surface within the storage space, a very uniform distribution is obtained as the conveyor outlet section 7 moves along the circular path 18 and the end distributor 10 rotates about the outlet from the pipe bend 9 and directs the distribution of the material in overlapping circular patterns 19. In this arrangement the center column 3, located at the center of the storage space, does not have any effect on the uniform distribution of the material.

In another feature of the invention, the joint 13 which positions the outlet end of the conveyor section 7, can be moved with the arm 12 in the radial direction from the center column for adjusting the diameter of the circular path 18 at random.

Further, it is preferable to use an air-driven end distributor 10 to avoid the use of cable connections between a stationary motor and the distributor 10.

While specific embodiments of the invention have been shown and described in detail to illustrate the application of the inventive principles, it will be understood that the invention may be embodied otherwise without departing from such principles.

What is claimed is:

1. Apparatus for distributing stalks, leaves or bulk material into storage spaces, such as silos, hay barracks, hay towers and the like, comprising wall means laterally defining an upwardly extending storage space, a tubular conveyor device for discharging material into said storage space, said conveyor device comprising a first conveyor section for transporting the material to the upper end of said storage space, and at least a second conveyor section in communication with said first section, said second section having an outlet end located in the upper portion of said storage space for discharging material into said storage space, wherein the improvement comprises that said second conveyor section is pivotally displaceable about an axis intersecting its longitudinal axis at a point spaced axially from its outlet end, said second conveyor section comprises a plurality of telescopically displaceable sub-sections, means for suspending said second conveyor section and for displacing said outlet end of said second conveyor section along an arcuate path in a plane extending transversely of the upward direction of said storage space, said telescopically displaceable sub-sections being extended and retracted during travel of said outlet end along said arcuate path, said first conveyor section extends upwardly along and adjacent the exterior of said storage space, an arcuate bend member connecting said first and second conveyor sections so that said second conveyor section extends transversely of said first conveyor section, said arcuate bend member and said second conveyor section are pivotally displaceable about the vertical axis of said first conveyor section, and said means for suspending said second conveyor section includes an upright column centered within said storage space and the axis of said column defines the center about which said outlet end of said second conveyor section is displaceable along an arcuate path.

2. Apparatus, as set forth in claim 1, wherein said means for suspending said second conveyor section includes a guide rail extending across the upper end of said storage space transversely of its upright direction, a joint member member mounted on said guide rail and being pivotally displaceable about an upright axis transverse of said guide rail, and an arm supporting at one end said guide rail and joint member with its other end supported for pivotal displacement about an upright axis so that its end supporting said guide rail and joint member and said outlet end of said second conveyor section supported therefrom is displaceable along the arcuate path.

3. Apparatus, as set forth in claim 2, wherein the other end of said arm is movably supported on said column and is lockable thereon so that its one end along with said joint member is displaceable along a line extending radially from said column for varying the radius of the arcuate path along which said joint member and said outlet end of said second conveyor section is displaced.

4. Apparatus, as set forth in claim 3, wherein said joint member is displaceable relative to said guide rail.

5. Apparatus, as set forth in claim 2, wherein said telescopically displaceable sub-sections are suspended from said guide rail for movement relative thereto.

6. Apparatus, as set forth in claim 2, wherein a a bearing block is mounted on the outside of said storage space and said guide rail is movably displaceable through said bearing block, said bearing block is mounted for rotation about the upright axis of said first conveyor section so that said guide rail is displaceable about the upright axis of said first conveyor section in a plane extending transversely of the upright axis of said storage space.

7. Apparatus, as set forth in claim 3, wherein a motor and driving elements are disposed in operative engagement with said arm for rotating said arm about said column.

8. Apparatus, as set forth in claim 7, wherein switch means are associated with said motor for rotating said arms along a selected sector of its arcuate path about said column.

* * * * *